April 2, 1968            R. GREINER            3,375,916
METHOD AND APPARATUS FOR POSITIONING ARTICLES
ON A CONVEYER FOR PACKING THE SAME
Filed July 22, 1966
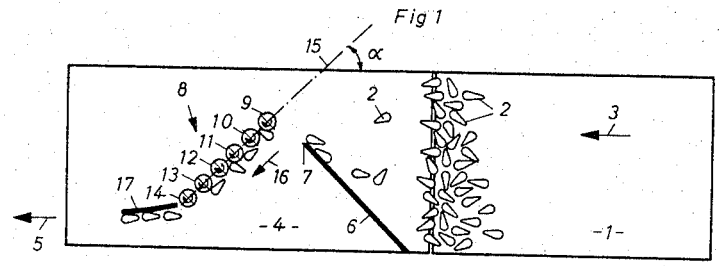
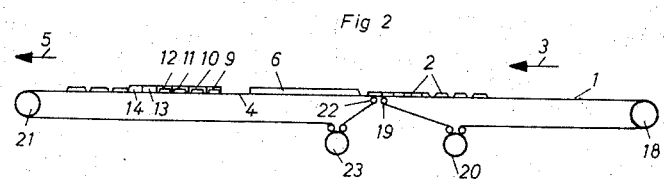
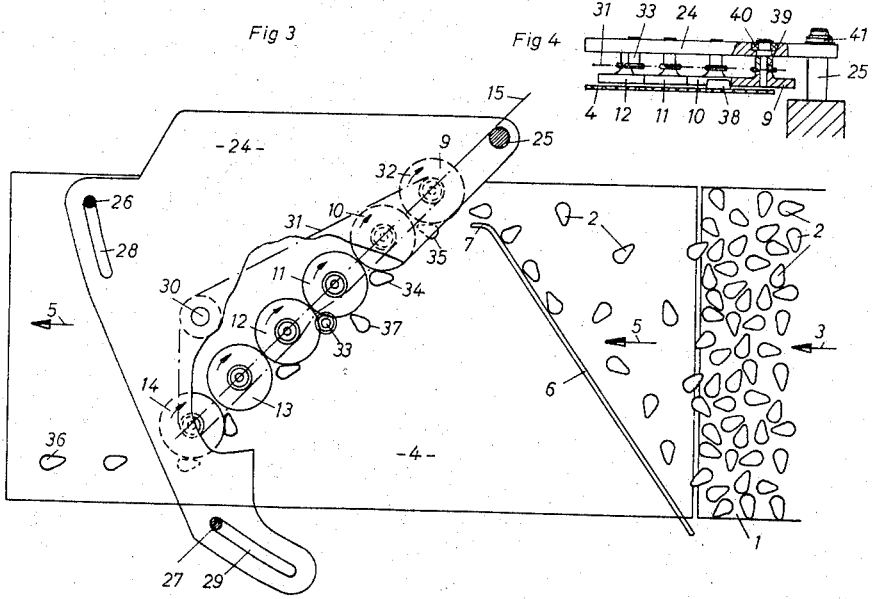
INVENTOR
ROLF GREINER
BY      Dicke + Craig
ATTORNEYS

United States Patent Office 3,375,916
Patented Apr. 2, 1968

3,375,916
METHOD AND APPARATUS FOR POSITIONING ARTICLES ON A CONVEYER FOR PACKING THE SAME
Rolf Greiner, Bruckenacker 18, Stuttgart-Vaihingen, Germany
Filed July 22, 1966, Ser. No. 567,210
Claims priority, application Germany, July 24, 1965, Sch 37,430
16 Claims. (Cl. 198—33)

ABSTRACT OF THE DISCLOSURE

Method and apparatus for positioning articles on a conveyor; more particularly, for separating and aligning irregularly-shaped articles such as pralines or similar candy on a conveyor which feeds them to a packing machine. The preferred method comprises the steps of conveying the articles in one direction, separating and spacing the articles at greater distances from each other and applying a force acting in a horizontal plane to a lateral surface of the articles, this latter force being applied intermittently to said articles. The different forces acting on the articles cause them to be reoriented on conveying apparatus and uniformly aligned with respect to their centers of gravity. The apparatus contemplated by the present disclosure comprises a first conveyor belt, a second conveyor belt which is aligned with the first belt and which operates at a higher speed than said first belt, a guide rail extending at an oblique angle to said second conveyor belt, and a series of rollers which are aligned in a line which extends at an oblique angle to said second conveyor belt. The rollers are disposed upon a supporting arm so as to be suspended a short distance above the surface of the second conveyor belt. The lateral surfaces of the articles on the conveyor are thus contacted by the surface of the rollers which are driven at a higher speed than the second conveyor belt. The angular position of the support arm with respect to the direction of travel of the second conveyor belt may be adjusted by means of a fixed pivot at one end of said arm and pin and slot connections at the opposite end thereof.

---

The present invention relates to a method and apparatus for positioning articles on a conveyer, and more particularly for drawing apart such articles, especially pralines or similar candy so as to be spaced from each other and for then aligning these articles with each other in corresponding positions on the conveyer which feeds them, for example, to a packing machine.

For packing pralines or similar articles of irregular shapes mechanically, the proper function of the packing mechanism of the packing machine generally requires these articles to be fed individually and in a certain position in a row behind each other into the machine. Prior to this invention it has, however, not been possible to carry out this necessary positioning operation properly solely by mechanical means, but the pralines or similar articles had to be deposited and properly placed on the conveyer by hand. Although various proposals have already been made for solving the difficulty of properly positioning the pralines or similar articles by mechanical devices, the results of all of these efforts have been unsatisfactory and also very uneconomical since these devices had to be made of a special design for each different type of praline or the like.

It is an object of the present invention to provide a method and apparatus which overcomes the above-mentioned disadvantages and by the provision of simple means permits pralines or similar articles of any different types and shapes to be properly positioned and aligned with each other fully automatically on a conveyor belt leading to a packing machine so that the latter will receive the pralines or the like in the order as required for the packing operation. Another important object of the invention is to provide an apparatus of the type as described above which is of such a simple design that it may be easily adjusted and serviced by an operator of average intelligence without special aptitude.

The method according to the invention consists in conveying the pralines or the like in a certain direction along a conveyor, in automatically separating them and spacing them at greater distances from each other, in then guiding them toward and along a positioning and aligning mechanism which changes the direction of travel of the pralines along the conveyor, imparts to them an additional driving movement and conveys the pralines with an undulating motion along the conveyor. Due to the changes of the relative speeds between the conveyer and the positioning and aligning mechanism, periodically acting forces are exerted upon the pralines or the like. These forces in cooperation with the forces which are exerted by the conveyer cause the pralines or the like to be placed in a balanced position and thereby in an equal direction and alignment with each other. According to the invention, the new method consists of moving the pralines or the like along the positioning mechanism which grips the outer surfaces of the pralines by means of several moving arcuate surfaces which are located behind each other and form a wavy row and intermittently accelerate the pralines in a direction which is preferably obliquely inclined to the direction of feed of the conveyer. When the pralines are thereby moved to their balanced position relative to the moving surfaces upon which they engage, they will remain in this position during each further arcuate movement until they leave the end of the positioning mechanism. This positioning mechanism produces the effect that pralines or similar articles which have an irregular shape and a center of gravity located out of the center of the longitudinal axis of the praline will always face toward the front in the direction of movement of the praline. If, however, the center of gravity of a praline or the like is located at the center thereof and if the relative speeds of the conveyer and the positioning mechanism are properly adjusted, such pralines will not be turned relative to the moving surfaces of the positioning mechanism. A frictional wear upon the lateral surfaces of the pralines will in both cases be almost completely avoided since relative movements which may produce such wear will occur only between the conveyer and the bottom surfaces of the pralines.

The apparatus according to the invention preferably further comprises or is combined with a feeding mechanism upon which the pralines are deposited at random and closely adjacent to each other, but with their bottom surfaces resting on the feeding surface. From this feeding mechanism the pralines are transferred to a conveyer belt which has a higher conveying speed than the feeding mechanism so that the pralines will be drawn more widely apart as soon as they are transferred to the conveyer belt which will then feed the pralines individually to the positioning mechanism.

The apparatus for carrying out the method according to the invention is preferably provided with several rollers which are rotatable about axes extending vertically to the conveyer belt and are mounted closely above the upper surface of the conveyer belt so that the pralines or the like while moving along this belt will engage upon these rotating rollers which are arranged so as to form a straight row which extends at an oblique angle to the direction of feed of the conveyer belt. Due to the frictional forces which occur between the rotating rollers and the pralines and also between the pralines and the conveyer belt, which forces differ in accordance with the different types of pralines, the pralines will according to the invention be turned to a certain balanced position by their engagement with the row of rotating rollers, and especially by entering into the angular gap between each pair of adjacent rollers, and after they have once attained this balanced position they will remain therein during their further movement. If several pralines lie directly adjacent to each other, they will be effectively separated from each other by their entry into the angular gaps between the rollers. The rollers are preferably rotated in such a direction that their sides which engage upon the pralines produce a speed component in the direction of feed so that the pralines will be accelerated and an undue accumulation of pralines on the aligning mechanism will be prevented. This speed component and resulting acceleration of the pralines also increases the output of the apparatus. By mounting the rollers behind each other in a straight row which extends at an oblique angle to the direction of travel of the conveyer belt, all rollers may be easily driven at the same speed in order to exert periodically acting forces upon the pralines. The apparatus according to the invention may be further designed in a very simple manner and neat arrangement by mounting the rollers on a pivotable supporting arm which may be easily exchanged for another, for example, when adjustments, repairs, or cleaning operations become necessary. The supporting arm may also be adjustable to different angular positions relative to the direction of feed of the conveyer belt, and it may for this purpose be provided with a scale or the like by means of which it is possible to adjust the supporting arm and the rotatable rollers thereon to the most suitable position for different types of pralines or the like. Thus, whenever a readjustment of the apparatus in accordance with a different type of pralines becomes necessary, it may be carried out very quickly and accurately and without any physical effort.

A preferred embodiment of the invention further provides that all of the rollers are driven by a common driving mechanism which is mounted on the supporting arm so that this arm together with the driving mechanism and the rollers forms a single structural unit.

A very simple and advantageous embodiment of the invention may be attained by providing the feeding mechanism in the form of a feeding belt which is driven at a considerably lower speed than the other conveyer belt which is associated with the positioning mechanism. The pralines or the like which may, for example, be deposited on the feeding belt very closely adjacent to each other will upon being transferred to the conveyer belt be drawn apart so as generally to engage successively with the rotating rollers and thereby facilitate the positioning and aligning operation.

The features and advantages of the present invention will become further apparent from the following detailed description thereof which is to be read with reference to the accompanying drawings, in which —

FIGURE 1 shows a diagrammatic plan view of an apparatus for carrying out the positioning and aligning process according to the invention;

FIGURE 2 shows a side view of the apparatus according to FIGURE 1;

FIGURE 3 shows, partly in section, an enlarged plan view of the apparatus as diagrammatically illustrated in FIGURE 1; while FIGURE 4 shows, partly in section, a side view of a part of the supporting arm together with the rotating rollers of the positioning apparatus according to FIGURES 1 and 3, as seen in the direction of feed of the conveyer belt.

Referring first particularly to FIGURE 1 of the drawings, a plurality of pralines 2 of a noncircular shape coming from a praline-making machine or the like are deposited at random upon a conveyer belt 1, but so as to rest with their bottom surface thereon, and are moved by the belt 1 in the direction of the arrow 3 until they arrive on and are transferred to a second conveyer belt 4 which travels at a higher speed than belt 1 and conveys the pralines further in the direction of the arrow 5. Since belt 4 travels at a higher speed than belt 1, the pralines 2 which lie in close proximity on belt 1 will be drawn apart on belt 4 and generally engage individually upon a guide rail 6 which extends diagonally to the direction of feed 5. Due to the continuous movement of the conveyer belt 4, the pralines 2 are then guided along this guide rail 6 up to its end 7 from which they are further conveyed in the direction toward the actual positioning and aligning mechanism 8. In place of this guide rail 6 it is also possible to provide a guide belt which travels about vertical axes and preferably at a speed higher than that of the conveyer belt 4. By employing such a guiding device the advantage will be attained that, after leaving this device all pralines will pass along the entire positioning mechanism and will therefore have a sufficient length of time to be properly positioned and aligned with each other.

The positioning mechanism 8 consists of a plurality of rollers 9 to 14 which are rotatable about vertical axes extending within a common straight plane 15. Due to the rotation of these rollers 9 to 14 and the simultaneous movement of the conveyer belt 4 in the direction of the arrow 5, the pralines 2 will be accelerated in the direction of the arrow 16 and be given an intermittent undulatory movement by their engagement with rollers 9 to 14 and will thereby be turned so as finally to face in the same direction in alignment with each other when leaving the end of the row of rollers forming the positioning mechanism 8. The row of pralines 2 may then slide further along a guide rail 17 and continue to travel on belt 4 in the direction of the arrow 5.

In place of the rotating rollers 9 to 14 it is also possible to provide an endless conveyer belt which travels in the direction of the arrow 16 closely above the surface of the conveyer belt 4 within a plane extending vertically to the plane of belt 4 and with an undulatory movement by being guided by suitable vertical guide means.

FIGURE 2 indicates that the conveyer belt 1 is supported on guide rollers 18 and 19 and is driven by an additional roller 20. The other conveyer belt 4 is mounted in a similar manner on guide rollers 21 and 22 and driven by a roller 23 which rotates at a speed which depends upon the type of pralines to be aligned and may be, for example, about 90 times as high as the speed of roller 20 which may have the same diameter as roller 23. The pralines will then move in the direction of the arrows 3 and 5.

A preferred embodiment of the apparatus according to the invention is illustrated in FIGURE 3, in which the rollers 9 to 14 are rotatably mounted on a supporting arm 24 which is pivotable about a pin 25 and adjustable to different angular positions relative to the conveyer belt 4, for example, by means of setscrews, not shown, on a pair of bolts 26 and 27 which extend through a pair of curved guide slots 28 and 29 of a sufficient length to allow the supporting arm 24 to be pivoted sufficiently. The supporting arm 24 also supports a drive shaft 30 on which a sprocket wheel is mounted which drives a chain 31, as indicated in dot-and-dash lines, which engages with similar sprocket wheels on the rollers 9 to 14 so as to rotate the same in the direction of the arrows 32. For adjusting the tension of chain 31, a tightening wheel 33 may be provided. The drive shaft 30 may be driven in any suitable manner, for example, by means of a V-belt which is connected to a motor which may be mounted adjacent to the conveyer belt 4. The motor for driving the shaft 30 may, however, also be mounted directly on the supporting arm 24. This would have the advantage that the supporting arm 24 would then carry the rollers 9 to 14 and all of their driving elements and form with them a unit which may be easily exchanged when necessary.

When the pralines after being transferred from the conveyer belt 1 to the second belt 4 and moved along the guide rail 6 are passed against the first roller 9 which rotates in the direction of the arrow 32, a frictional force is exerted by this roller upon each praline which tends to move it in a direction tangential to the periphery of roller 9, that is, downwardly and toward the left. Due to the friction between the conveyer belt 4 and the bottom surface of the praline, the latter is at the same time pressed against the peripheral surface of the rotating roller 9 and is thus taken along by the latter until it comes into engagement with the roller 10 which then conveys it to the next roller. Thus, while traveling along the row of rollers, each praline carries out a succession of arcuate movements, and at the end of each arcuate movement it is moved into the angular gap between each pair of adjacent rollers.

Aside from this succession of arcuate movements, each praline may, however, also carry out rotary movements about its own axis which are due to the torque which is produced by the frictional forces which are exerted by the rotating rollers upon the praline. This torque becomes effective especially when a praline, for example, the praline 34, enters into the angular gap between two adjacent rollers, for example, the rollers 10 and 11, since it will then be acted upon by the forces of both rotating rollers. This torque which is exerted by the rollers upon the praline is opposed by a torque which results from the frictional forces between the conveyer belt 4 and the praline. Since the size of the individual forces acting upon the pralines depends upon the speed of travel of the conveyer belt 4 and its direction of travel 15, the speed of rotation and the diameter of the rollers 9 to 14, and the size of the angle of the plane 15 within which the rollers are mounted, these values may be adjusted in relation to each other so as to eliminate each other when the praline has assumed a certain position. This may be attained, for example, by adjusting the plane 15 of the rollers 9 to 14 at a suitable angle relative to direction of feed 5, while these rollers are rotated at a constant speed and the conveyer belt 4 is also moved at a constant speed. In actual practice it has been found that it will not be necessary also to vary the speed of rotation of the rollers 9 to 14. Usually it will therefore only be necessary to adjust the angle between the plane 15 and the feeding direction 5 and the speed of travel of the conveyer belt 4 in relation to each other in order to align the pralines properly in a row and in corresponding positions within this row. The larger the angle α, as indicated in FIGURE 1, is made between the plane 15 and the feeding direction 5 up to a maximum of 90°, the lower must be the feeding speed of the conveyer belt 4 in order to attain the same effect, while the speed of rotation of the rollers 9 to 14 remains constant.

When in the particular example as illustrated the praline 35 leaves the angular gap between the rollers 9 and 10, it will due to the acceleration by these rollers be turned so that its center of gravity, i.e. its thicker right end, will thereafter face in the direction toward the last roller 14 and will thereafter also pass in the same position between the following rollers, that is, in the position in which the praline 34 is shown between the rollers 10 and 11. Consequently, during its following travel along the periphery of the rotating rollers, each praline will due to its position in which its center of gravity is forwardly directed no longer be subjected to any torque and will therefore continue to travel in a tangential direction along the rollers with its thicker end facing forwardly. Therefore, after leaving the roller 14 each praline will be in the position as indicated by the praline 36. A relative movement and therefore a frictional wear upon the chocolate coating of the pralines will therefore only occur on their bottom surfaces by their engagement with the conveyer belt 4.

FIGURE 4 illustrates that the praline 38 rests on the conveyer belt 4 and that the rollers 9 to 12 are located so closely above the upper surface of the conveyer belt 4 that they will engage upon the peripheral surface of the praline 38. As indicated by the roller 9 which is shown in cross section, each shaft carrying one of the rollers is provided with a drive pinion 39 which may be driven by a chain 31, as indicated by a dot-and-dash line, which may be tightened by the tightening wheel 33. The shaft of roller 9 is mounted on a ball bearing 40 in the supporting arm 24.

After the nut 41 or a similar device has been removed from the pivot pin 25, the supporting arm 24 including the rollers and their driving means may also be removed and replaced, for example, by another supporting arm which is provided with rollers of a smaller diameter. Since these elements are combined with each other so as to form a single structural unit, it is also very easily and quickly possible to remove this unit from the remainder of the apparatus for cleaning it or for carrying out any repairs which might be necessary.

By means of the positioning mechanism according to the invention it is possible to align and properly position pralines or the like of any types and shapes in a very simple and reliable manner and without any manual assistance so as to permit them to be fed in such a position and alignment to a packing machine or to another station for being further treated. The entire apparatus may be easily and quickly readjusted from one type of pralines to another and there is thus no danger that the production or packing of pralines of another type or shape might have to be stalled for any considerable length of time because of the necessary readjustment of the positioning apparatus. It is also obvious from the above description that the present invention is not limited to the positioning, aligning and feeding of pralines or the like, but that it may also be applied for a similar treatment of other articles.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An apparatus for drawing apart, positioning and aligning articles, especially pralines or the like, while being moved comprising a conveyer belt adapted to travel in one direction for feeding said articles, and a positioning mechanism above said belt and comprising a plurality of rollers, means for mounting said rollers behind each other in a row extending at an oblique angle to said feeding direction of said belt and in a position closely above said belt so that when said articles are moved in said feeding direction, the outer surfaces of said articles will engage with the peripheral surfaces of said rollers, and driving means for rotating all of said rollers in the same direction.

2. An apparatus as defined in claim 1, in which said driving means are adapted to rotate said rollers in such a direction that their sides engaging with said articles will produce a speed component in said feeding direction of said belt.

3. An apparatus as defined n claim 1, in which said rollers are rotatable about axes extending substantially vertical to the upper surface of said belt, said axes being disposed within a straight line extending at an angle to said feeding direction of said belt.

4. An apparatus as defined in claim, in which said mounting means comprise a supporting arm carrying said rollers, and means for pivoting said supporting arm about an axis extending substantially vertical to the upper surface of said belt.

5. An apparatus as defined in claim 4, further comprising means for adjusting said supporting arm to, and securing said arm in different angular positions relative to said feeding direction of said belt and parallel to the upper surface thereof.

6. An apparatus as defined in claim 1, in which said driving means comprise a common driving mechanism for all of said rollers.

7. An apparatus as defined in claim 1, in which said driving means comprise a common driving mechanism mounted on said supporting arm so that said supporting arm together with said driving means and said rollers forms a single structure unit.

8. An apparatus as defined in claim 1, further comprising a feeding belt preceding said conveyer belt and adapted to receive said articles closely adjacent to each other when said articles are placed thereon at random but with their bottom surfaces resting on said feeding belt, said feeding belt being adapted to feed said articles to said conveyer belt and to transfer them thereto, and means for driving said conveyer belt at a higher speed than said feeding belt so as to draw said articles apart when being transferred from said feeding belt to said conveyer belt.

9. An apparatus as defined in claim 8, further comprising means for adjusting the speeds of said feeding belt and said conveyer belt.

10. An apparatus as defined in claim 1, further comprising means for adjusting the speed of said rollers.

11. An apparatus as defined in claim 1, further comprising a guiding device in front of said supporting arm, as seen in said feeding direction of said conveyer belt, for guiding said articles substantially to one point of said conveyer belt substantially in alignment with the first of said rollers.

12. An apparatus as defined in claim 11, in which said guiding device comprises a stationary guide rail extending at an oblique angle to said feeding direction of said conveyer belt and closely above the latter, said articles engaging upon said guide rail during their movement on said conveyer belt and then sliding along said rail toward its end facing said first roller.

13. An apparatus as defined in claim 12, in which said end of said guide rail is bent over in said feeding direction of said conveyer belt and toward said first roller.

14. A method for separating, orienting and aligning irregularly-shaped objects such as pralines and the like, which are supplied randomly distributed over a relatively wide area, comprising the steps of applying a first force upon the base of the articles and simultaneously applying a second force in an approximately horizontal plane in a direction which forms an acute angle with the direction of said first applied force, said second force acting upon the lateral surfaces of the articles at a number of points spaced from one another in a line coinciding with said direction of application of said second force, wherein the points of application of said second force are disposed on a plurality of arcuately-shaped surfaces, said surfaces being aligned in a row closely adjacent one another, said second force being applied by the motion of said arcuately-shaped surfaces, said surfaces moving in a common direction, said second force having a component tangential to said arcuately-shaped surfaces, said tangential component acting on the articles in a direction transverse to the direction of said first force.

15. A method according to claim 14, wherein said tangential component of said second force acts in a direction which forms an acute angle with the direction of said first force.

16. A method according to claim 14, wherein, prior to the application of said second force, the magnitude of said first force is abruptly increased, thus separating and spacing the articles at a greater distance from each other.

References Cited

UNITED STATES PATENTS

| | | | |
|---|---|---|---|
| 1,319,190 | 10/1919 | Houten | 198—34 |
| 1,959,238 | 5/1934 | Horsfield | 198—34 X |
| 2,047,106 | 7/1936 | Lidberg | 198—30 X |
| 2,560,995 | 7/1951 | Stiles | 198—30 X |
| 3,104,753 | 9/1963 | Osborne | 198—30 |
| 3,240,311 | 3/1966 | Hofer | 198—34 |

EDWARD A. SROKA, *Primary Examiner.*

UNITED STATES PATENT OFFICE

CERTIFICATE OF CORRECTION

Patent No. 3,375,916                      April 2, 1968

Rolf Greiner

It is certified that error appears in the above identified patent and that said Letters Patent are hereby corrected as shown below:

In the heading to the printed specification, lines 5 to 6, "Rolf Greiner, Bruckenacker 18, Stuttgart-Vaihingen, Germany" should read -- Rolf Greiner, Stuttgart-Vaihingen, Germany, assignor to Schoko-Buck G.m.b.H., Stuttgart-O, Germany --.

Signed and sealed this 5th day of August 1969.

(SEAL)
Attest:

Edward M. Fletcher, Jr.

Attesting Officer

WILLIAM E. SCHUYLER, JR.

Commissioner of Patents